US008887851B2

(12) United States Patent
Okubo et al.

(10) Patent No.: US 8,887,851 B2
(45) Date of Patent: Nov. 18, 2014

(54) SADDLE-RIDE TYPE VEHICLE

(75) Inventors: Takefumi Okubo, Wako (JP); Atsushi Takasaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 117 days.

(21) Appl. No.: 13/605,063

(22) Filed: Sep. 6, 2012

(65) Prior Publication Data
US 2013/0075184 A1 Mar. 28, 2013

(30) Foreign Application Priority Data
Sep. 28, 2011 (JP) ................................. 2011-213181

(51) Int. Cl.
*B62D 23/00* (2006.01)
*B60K 13/04* (2006.01)
*B62K 19/48* (2006.01)
*B62J 17/00* (2006.01)
*B62J 7/04* (2006.01)

(52) U.S. Cl.
CPC . *B62J 7/04* (2013.01); *B62K 19/48* (2013.01); *B62J 17/00* (2013.01)
USPC .......................... 180/89.1; 180/89.2; 180/309

(58) Field of Classification Search
CPC .... B62D 25/081; B62D 25/08; B62D 25/082; B62D 25/085; B62D 25/084; B62J 17/00; B62J 17/02; B62J 17/04; B62J 17/06; B62J 2017/00; B62K 11/04; B62K 11/00; B62K 5/01; B62K 5/00; B60K 11/04; B60K 13/04
USPC ............ 180/311, 309, 68.4, 68.6, 68.1, 68.2, 180/229, 89.1, 89.2; 296/78.1
See application file for complete search history.

(56) References Cited

U.S. PATENT DOCUMENTS

| 4,678,223 | A  | * | 7/1987  | Kishi et al. ................... 296/78.1 |
|-----------|----|---|---------|------------------------------------------|
| 5,107,949 | A  | * | 4/1992  | Gotoh et al. .................. 180/219  |
| 7,448,461 | B2 | * | 11/2008 | Misaki et al. ................. 180/68.4 |
| 7,520,359 | B2 | * | 4/2009  | Iwanaga ........................ 180/219 |
| 7,556,115 | B2 | * | 7/2009  | Iwanaga ........................ 180/229 |
| 7,850,221 | B2 | * | 12/2010 | Nakata et al. ................. 296/78.1 |
| 7,967,337 | B2 | * | 6/2011  | Misaki et al. ................. 280/781  |
| 8,177,250 | B2 | * | 5/2012  | Fukuyama et al. ........ 280/288.4      |
| 8,230,958 | B2 | * | 7/2012  | Takahashi et al. ........... 180/68.1   |
| 8,631,888 | B2 | * | 1/2014  | Iida et al. ..................... 180/68.1 |
| 8,746,774 | B2 | * | 6/2014  | Yasuhara et al. ............. 296/78.1  |

FOREIGN PATENT DOCUMENTS

JP 2006-281893 A 10/2006

* cited by examiner

*Primary Examiner* — J. Allen Shriver, II
*Assistant Examiner* — James M Dolak
(74) *Attorney, Agent, or Firm* — Birch, Stewart, Kolasch & Birch, LLP

(57) ABSTRACT

A saddle-ride vehicle for reducing air resistance flowing toward the rear of the vehicle. A saddle-ride type vehicle includes a front cowl in a vehicle front part and a rear cowl provided in a vehicle rear part. The rear cowl is provided with a bulging part protruding to the left and right in a vehicle widthwise direction. In addition, the bulging part protrudes outward of the rear edges of the front cowl in the vehicle widthwise direction. Further, side surfaces of the bulging part are each formed in a curved shape which bulges toward an outside of the vehicle in a plan view of the vehicle. Furthermore, a peak part which is located at an outermost edge of the side surface in the vehicle widthwise direction is located at a position closer to the front of the vehicle within a length of the bulging part in a vehicle front-rear direction.

19 Claims, 10 Drawing Sheets

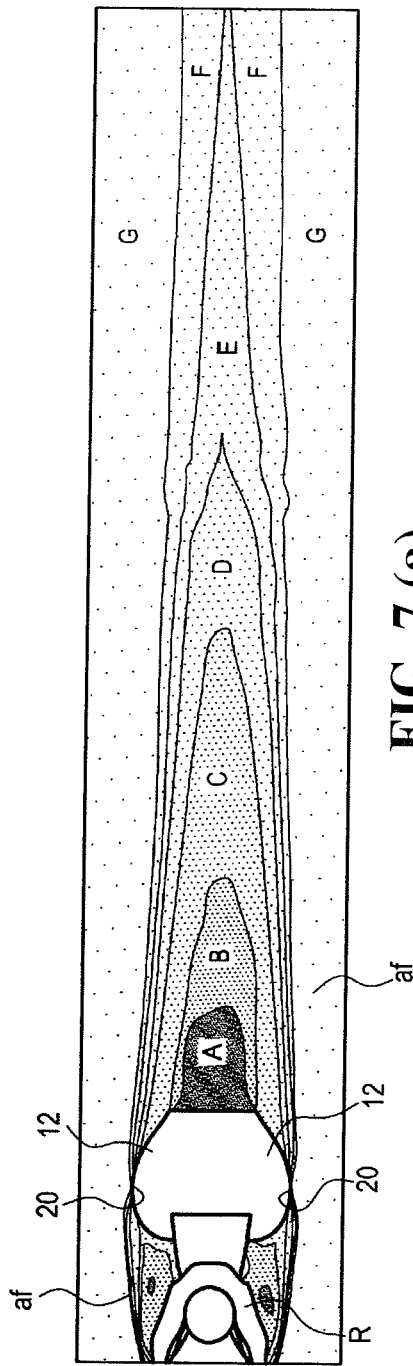 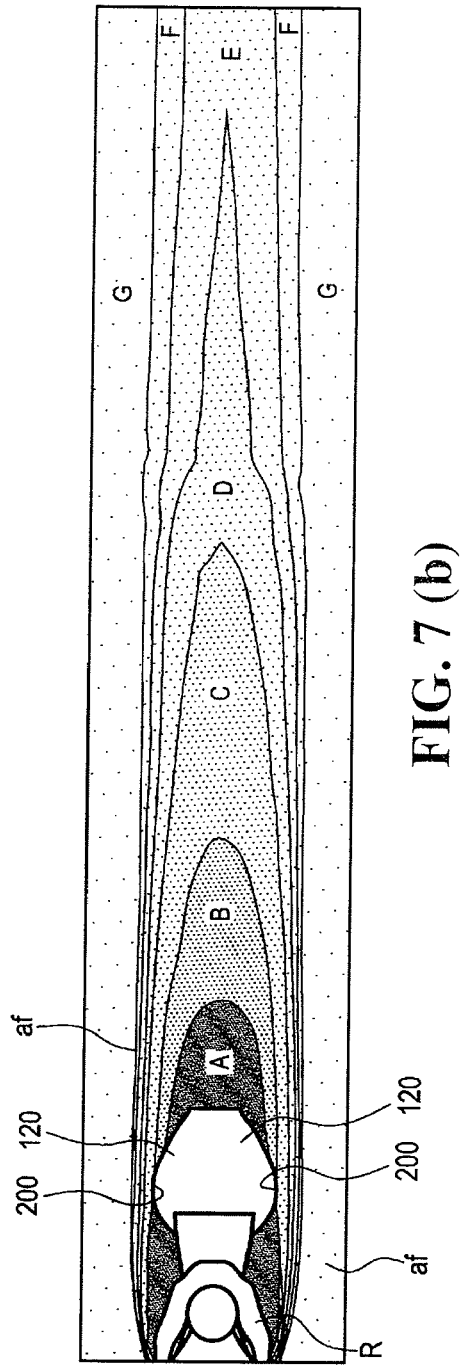
FIG. 7 (a)    FIG. 7 (b)

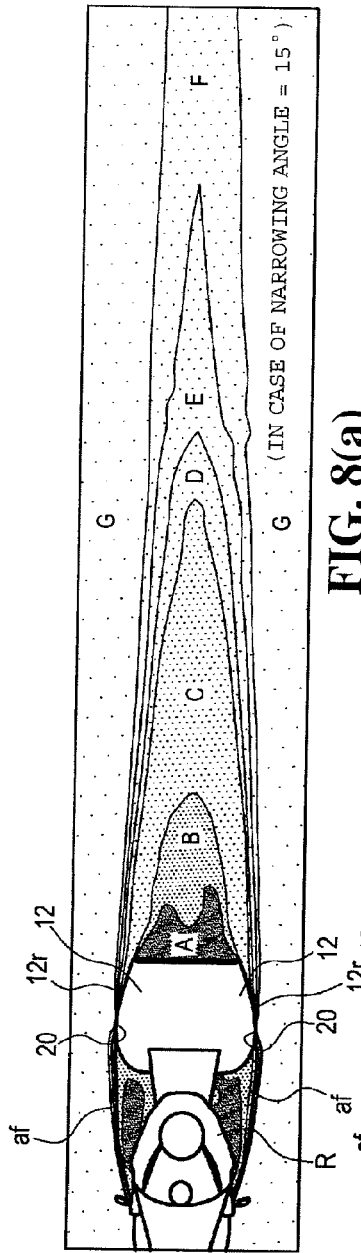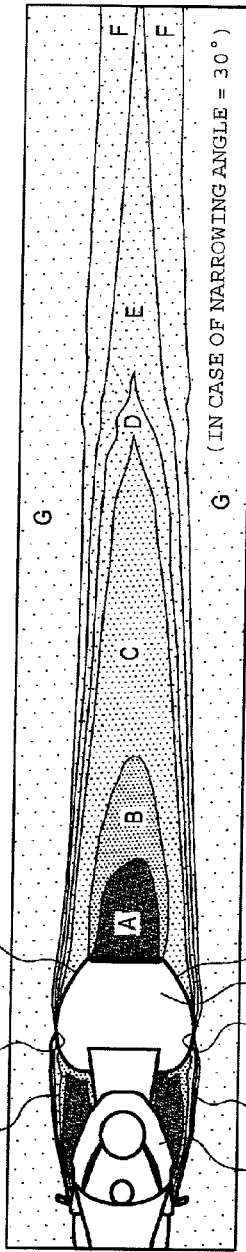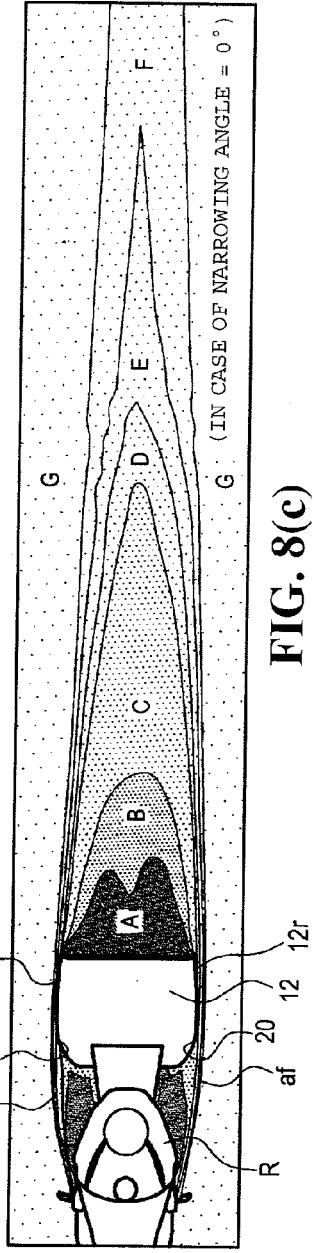

SADDLE-RIDE TYPE VEHICLE

CROSS-REFERENCE TO RELATED APPLICATIONS

The present application claims priority under 35 USC 119 to Japanese Patent Application No. 2011-213181 filed Sep. 28, 2011 the entire contents of which are hereby incorporated by reference.

BACKGROUND OF THE INVENTION

1. Field of the Invention

The present invention relates to a saddle-ride type vehicle, and particularly to a saddle-ride type vehicle having a vehicle body structure capable of reducing the air resistance during operation.

2. Description of Background Art

A conventional motorcycle includes a side cowl in the front and a side trunk in the rear. Japanese Patent Application Publication No. 2006-281893 discloses a structure in which a front part of the side trunk is formed in a curved shape.

In Japanese Patent Application Publication No. 2006-281893, there is no disclosure about a flow of air created in relation to the amount of protrusion of the side trunk in the vehicle widthwise direction and the amount of protrusion of the side cowl in the vehicle widthwise direction. A flow of air (airflow) created when the amount of protrusion of the side trunk in the vehicle widthwise direction is larger than the amount of protrusion of the side cowl in the vehicle widthwise direction will be discussed.

More specifically, a flow of air flowing along the side cowl during the operation of the motorcycle is once separated from the motorcycle at a rear edge of the side cowl, and flows rearward. If the side trunk protrudes greater than the side cowl in the vehicle widthwise direction, the flow of air having been separated from the rear edge of the side cowl is again brought into contact with the side trunk. In this respect, if a front part of the side trunk is formed in the shape of a curved surface which bulges forward, the flow of air can contact a side surface of the side trunk again without being separated from the side surface, thus reducing the air resistance.

However, this conventional example does not disclose a technique to reduce the air resistance generated by the turbulent flow of air in and behind a rear portion of a motorcycle during operation, or what is termed as rear airflow. Thus, a technique to reduce the air resistance generated on a rear side of a saddle-ride type vehicle such as a motorcycle is desired.

SUMMARY AND OBJECTS OF THE INVENTION

The present invention has been made in consideration of the foregoing circumstances. An object of an embodiment of the present invention is to provide a saddle-ride type vehicle including a vehicle-body structure which is capable of reducing the air resistance generated by the rear airflow flowing toward the rear of the vehicle during operation.

For the purpose of achieving the foregoing object, according to an embodiment of the present invention, a saddle-ride type vehicle includes a front cowl provided in a vehicle front part; and a rear cowl provided in a vehicle rear part, wherein the rear cowl is provided with a bulging part protruding to the left and right in a vehicle widthwise direction. The bulging part protrudes outward of rear edges of the front cowl in the vehicle widthwise direction with side surfaces of the bulging part each formed in a curved shape which bulges toward the outside of the vehicle at least in a plan view of the vehicle. A peak part, which is located at an outermost edges of the side surfaces in the vehicle widthwise direction, is located at a position closer to the front of the vehicle within a length of the bulging part in a vehicle front-rear direction.

According to an embodiment of the present invention, the bulging part is formed in an approximate streamline shape which continues from a foremost end part to a rearmost end part of the bulging part in the plan view of the vehicle.

According to an embodiment of the present invention, in the plan view of the vehicle, a largest narrowing angle $\theta$ between a straight line passing through the peak part in the vehicle front-rear direction and a tangent to a rear side surface extending from the peak part to the rearmost end part is set in a range of 0° to 15°.

According to an embodiment of the present invention, a muffler part is placed below and adjacent to the bulging part. The bulging part includes an upper front curved part which bulges upward from a front surface to an upper surface of the bulging part in a side view. In addition, the muffler part includes a lower front curved part which bulges downward from a front surface to a lower surface of the muffler part in the side view. The front surface of the bulging part (12) and the front surface of the muffler part are situated almost flush with each other on a continuous curve.

According to an embodiment of the present invention, in the side view of the vehicle, the bulging part is formed in an approximate streamline shape, including the upper front curved part located on an upper side of the bulging part, an upper rear curved part located rearward of the upper front curved part and a lower curved part located on a lower side of the bulging part.

According to an embodiment of the present invention, in the side view of the vehicle, the muffler part is formed in an approximate streamline shape, including the lower front curved part, a lower rear curved part located rearward of the lower front curved part and a muffler upper curved part located in an upper part of the muffler part.

According to an embodiment of the present invention, in a front view of the vehicle, a bulging part vertical side surface of the bulging part and a muffler part vertical side surface of the muffler part are formed, situated on a side surface vertical direction that is curved which continues as an almost level surface.

According to an embodiment of the present invention, the muffler part is held by a muffler stay extending downward under the bulging part, and a horizontal cross section of the muffler stay in the vehicle front-rear direction is shaped like a cross section of a wing.

According to an embodiment of the present invention, the muffler part is provided on each of the left and right sides of the vehicle.

According to an embodiment of the present invention, the bulging part is formed from a side trunk.

According to an embodiment of the present invention, the bulging part protrudes, to both the left and right sides of the vehicle in the vehicle width direction, greater than the width of the vehicle between the rear edges of the front cowl. Thereby, the airflow once having been separated from the rear edges of the front cowl can be brought into contact with the bulging part again. Thus, the airflow once having been separated from the vehicle can be controlled by being in contact with an outer surface of the bulging part. Further, since the side surfaces of the bulging part are each formed in a curved shape which bulges toward the outside of the vehicle in the plan view of the vehicle, the airflow which has been separated from the front cowl and flows can be easily brought into contact with the vehicle body again, and the airflow which has contacted the vehicle body again can be easily made to flow along the side surfaces of the bulging part. Further, since the peak part is located at a position closer to the front of the vehicle within the length of the bulging part in the vehicle front-rear direction, the airflow again having contacted the vehicle body can be guided toward the rear of the vehicle with its larger length. Thereby, the airflow once having been divided by the vehicle can be smoothly guided toward the rear of the vehicle in a way that airflows thus divided come close to each other.

This makes it possible to reduce the whirl of the airflow on the rear side of the vehicle. Thus, the air resistance is reduced.

According to an embodiment of the present invention, the bulging part is formed in a curved shape which continues from the foremost end part and the rearmost end part of the bulging part in the plan view of the vehicle. This makes it possible to optimize the air guidance function in the entire side surfaces of the bulging part. Thus, the air resistance with the bulging part is effectively reduced.

According to an embodiment of the present invention, in the side surfaces of the bulging part, the narrowing angle between the straight line passing through the peak part in the vehicle front-rear direction and the tangent extending from the peak part toward the rear of the vehicle is in the range of 5° to 15°. This makes it possible to favorably maintain the function of guiding the airflow toward the rear of the vehicle. Thus, the air resistance is reduced. To put it concretely, if the narrowing angle is smaller than 5°, it is difficult to exert the function of actively preventing the turbulence of the airflow behind the vehicle, and hence the narrowing angle is preferably equal to or larger than 5°. On the other hand, if the narrowing angle is larger than 15°, the air is more likely to be separated from the side surfaces of the bulging part, and hence the narrowing angle is preferably equal to or lower than 15°. In sum, the airflow behind the vehicle can be stabilized with the narrowing angle in the range of 5° to 15°.

According to an embodiment of the present invention, in the state where the bulging part and the muffler part are arranged side by side with each other, the contour of the front surfaces of both members in the side view of the vehicle is shaped like a curve which continues as an almost single surface. Thereby, the overall structure formed by pairing both parts in the vehicle up-down direction can be made to take on a shape which is less likely to disturb airflow. Accordingly, the air resistance can be reduced.

According to an embodiment of the present invention, the bulging part is formed in the approximate streamline shape in the side view as well. Thereby, the airflow seen in the side view of the vehicle can also be made to flow toward the rear of the vehicle effectively.

According to an embodiment of the present invention, the muffler part is formed in the approximate streamline shape in the side view. Thereby, the airflows above and below the muffler part can be made to flow toward the rear of the vehicle effectively.

According to an embodiment of the present invention, the bulging part vertical side surface of the bulging part and the muffler part vertical side surface of the muffler part take on their respective shapes which are situated on the side surface vertical direction curved continuing as the almost single surface. Thereby, the side-surface overall structure formed by pairing both members can be made to take on a shape which makes the airflow flow smoothly. Accordingly, the air resistance can be reduced.

According to an embodiment of the present invention, not only can the load of the muffler part be supported firmly by the muffler stay; but also, the airflow between the bulging part and the muffler part can be formed as stable airflow which will not be disturbed by the muffler stay. In addition, it is possible to reduce the air resistance generated by the airflow which passes between the bulging part and the muffler part.

According to an embodiment of the present invention, the muffler parts are respectively provided on both the left and right sides of the vehicle. This makes the overall structure on the rear side of the vehicle formed in a shape symmetric on both the left and right sides of the vehicle. Accordingly, it is possible to put the airflow on each side of the vehicle in the same condition, to form stable airflow, and thereby to reduce the air resistance.

According to an embodiment of the present invention, the bulging part is formed from the side trunk. This makes it possible to use, as a storage space capable of storing a lot of articles, the shape in which the bulging part protrudes largely to the left and right in the vehicle widthwise direction in order to make the airflow favorable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) and 7(b) are schematic diagrams each showing flow velocity distribution of the air around the motorcycle of the present invention in a plan view of the vehicle, and concurrently showing how a difference in the amount of protrusion of the bulging part influences the flow velocity distribution;

FIGS. 8(a) to 8(c) are schematic diagrams each showing the flow velocity distribution of the air around the motorcycle of the present invention in the plan view of the vehicle, and concurrently showing how a difference in a narrowing angle of the bulging part influences the flow velocity distribution;

DETAILED DESCRIPTION OF THE PREFERRED EMBODIMENTS

Figure 1:
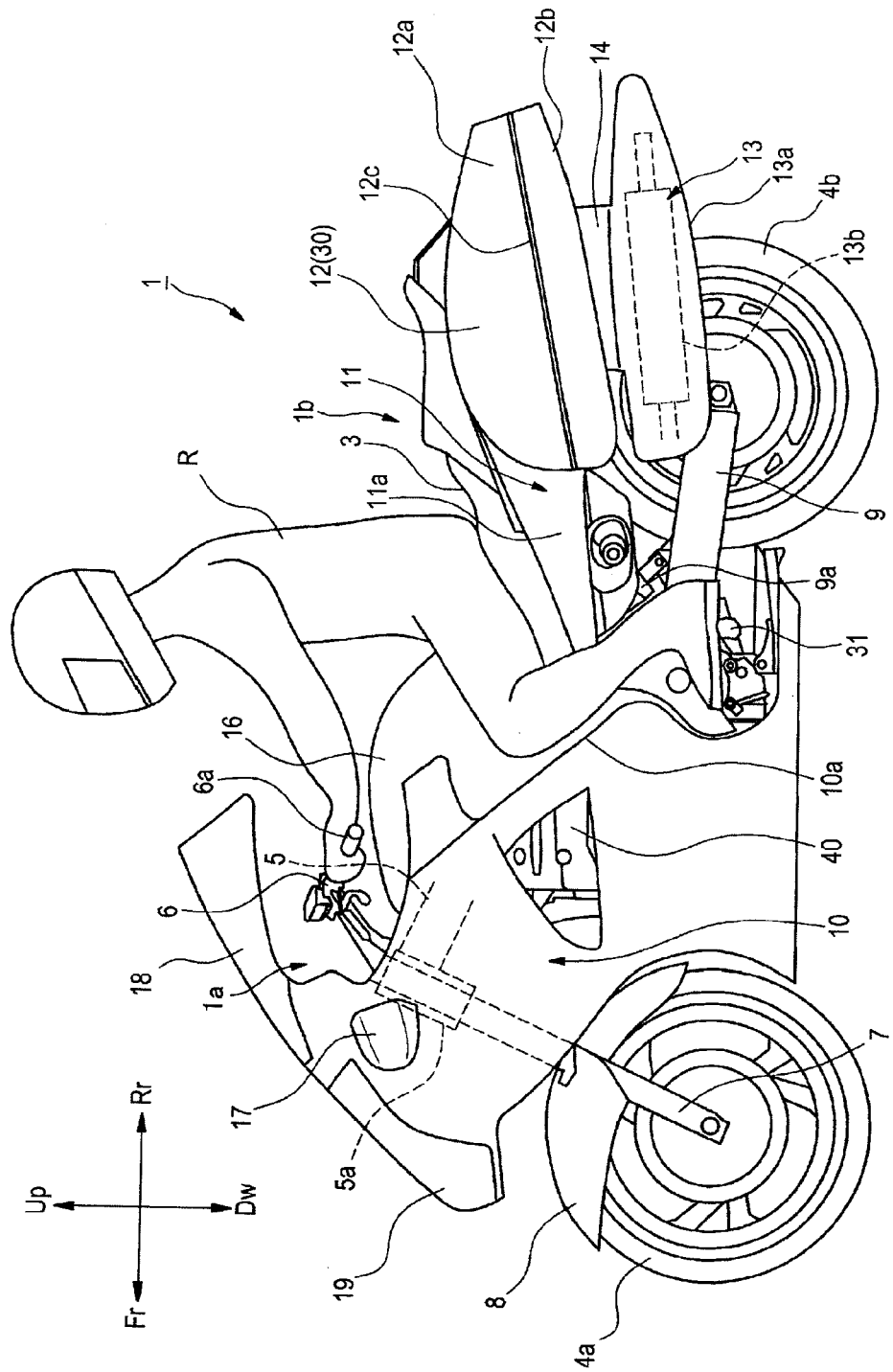
FIG. 1 is a left side view of an embodiment of a motorcycle which is a saddle-ride type vehicle of the present invention.

Hereinbelow, an embodiment of the present invention will be described.

First of all, the embodiment of the present invention will be described in detail by referring to FIGS. 1 to 10.

Note that the accompanying drawings should be viewed in the direction of orientation of the reference numerals. In the following description, frontward, rearward, leftward, rightward, and ward and downward of a vehicle indicate directions seen by an individual operating the vehicle. In the drawings, Fr indicates the front of the vehicle; Rr, the rear; L, the left side; R, the right side; Up, the upside; and Dw, the downside of the vehicle.

As shown in FIG. 1, in a motorcycle (saddle-ride type vehicle) 1 of the embodiment, a front wheel 4a is attached to a front fork 7 turnably installed on the head pipe 5a located at a front portion of a vehicle body frame 5; and a steering handlebar 6 is provided to an upper portion of the head pipe 5a.

In addition, the motorcycle 1 includes a front cowl 10 covering a front part and a part lateral to the front part of the vehicle body frame 5. A vehicle front part 1a below an engine 40 is provided together with a rear cowl 11 having rear side covers 11a to cover a vehicle rear part 1b as appropriate.

In addition, in the embodiment, bulging parts 12, which will be described later, protruding to the left and right of the vehicle is provided behind a seat 3 seated by a rider R.

In FIG. 1, a headlight 19 is provided flush with a front surface of the front cowl 10; a curved shield 18 is provided above the headlight 19; and side mirrors 17 are provided at the left and right sides of the curved shield 18. The steering handlebar 6 is located on a rear side and inner side of the curved shield 18. The front wheel 4a and a front fender 8 which covers the front wheel 4a are provided to the front fork 7 to which the steering handlebar 6 is connected. Moreover, a fuel tank 16 is placed ahead of the seat 3.

The rider R rides on the motorcycle 1 of the above structure by placing his/her feet on steps 31 provided on a lower side of an approximately central portion of the vehicle; and holding grips 6a with his/her two hands.

Further, a rear wheel 4b is attached to an end of a swingarm 9 attached swingably to a part of the vehicle body frame 5, and is supported thereby through a shock absorber unit 9a. The driving force of the engine 40 is transmitted to the rear wheel 4b through a chain and the like which are not illustrated.

The engine 40 includes paired left and right exhaust pipes, for example, connected to exhaust ports and paired left and right muffler parts 13 connected respectively to downstream ends of the paired left and right exhaust pipes.

Note that: in the embodiment, each muffler part 13 has a structure in which a muffler cover 13a covers a muffler main body 13b. However, the muffler part 13 may have a structure without the muffler cover 13a, in which the muffler main body 13b is formed in the same shape as is the muffler cover 13a shown in FIG. 1.

As described above, in the embodiment, the motorcycle 1 includes the front cowl 10 provided in the vehicle front part 1a and the rear cowl 11 extending toward the rear part 1b of the vehicle from under the seat 3. The rear cowl 11 is provided with the paired left and right bulging parts 12 having the same shape, and protruding in a vehicle widthwise direction.

Figure 2:
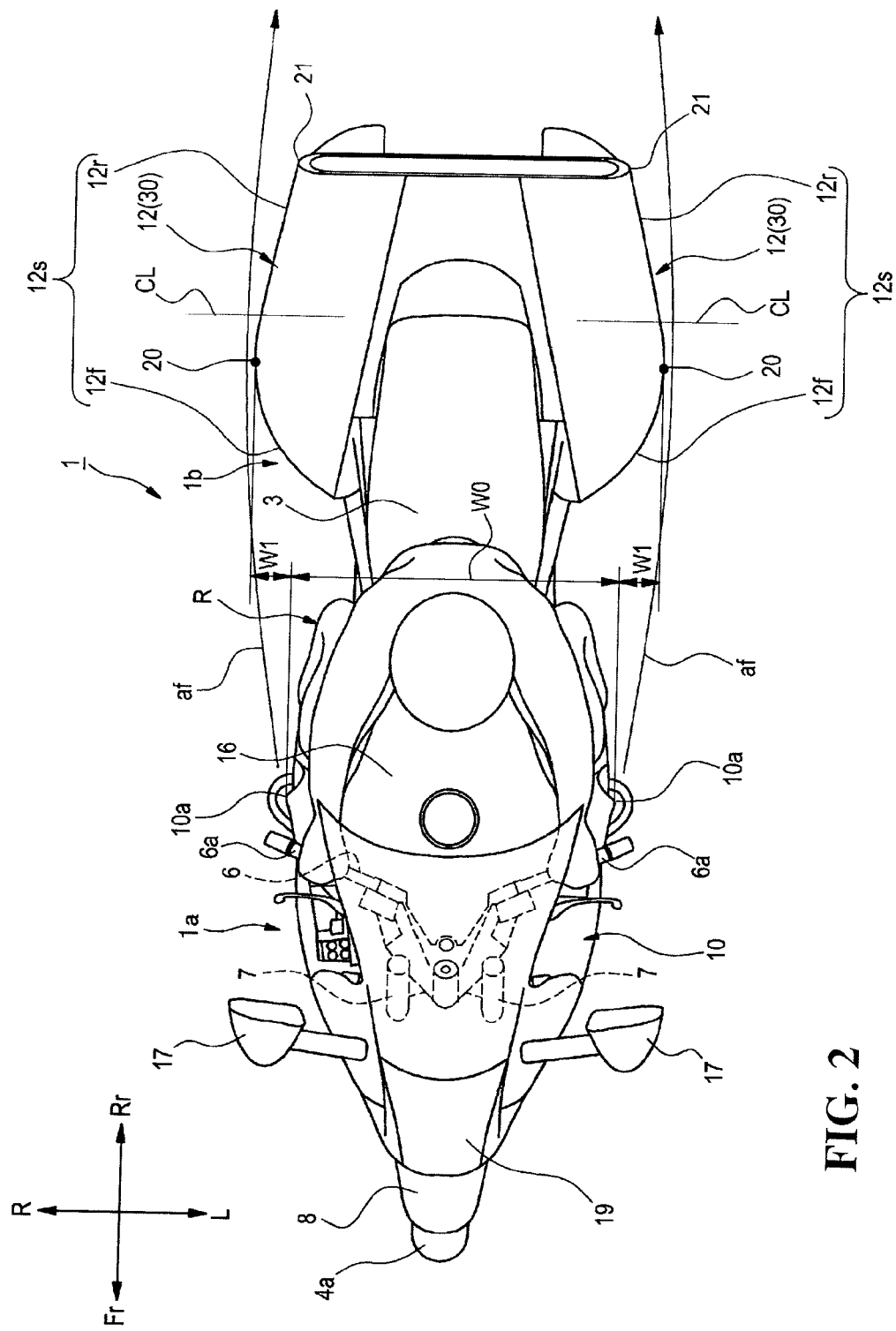
FIG. 2 is a plan view of the motorcycle shown FIG. 1 seen from above the vehicle.

As shown in FIG. 2 which is a plan view of the vehicle, the bulging parts 12 protrude largely outward to the left and right in the vehicle widthwise direction, respectively, beyond a vehicle width W0 between rear edges 10a of the front cowl 10 (i.e., parts protruding most in the front cowl 10 in the vehicle widthwise direction). Peak parts 20, which set the amounts of protrusion of the bulging parts 12 at the largest amounts W1, are formed located in positions which are bilaterally symmetrically, respectively.

In addition, in the plan view, side surfaces 12s (the entire side surfaces) of the bulging parts 12 each form a continuous curved formed of a front side surface 12f located forward of the corresponding peak part 20 and a rear side surface 12r located rearward of the peak part 20, and have a smooth shape that bulges toward the outside of the vehicle. Here, the rear side surface 12r is formed in a way that makes the curvature become gradually larger toward the rear of the vehicle.

Moreover, in the embodiment, each peak part 20 having a curved shape and being located at the outermost edge in the vehicle widthwise direction is located at a position closer to the front of the vehicle within the length of the bulging part 12 in the vehicle front-rear direction. In other words, the peak part 20 is formed located at a position closer to the front of the vehicle than a front-rear direction central position CL of the bulging part 12, as shown in FIGS. 2 and 3.

Figure 3:
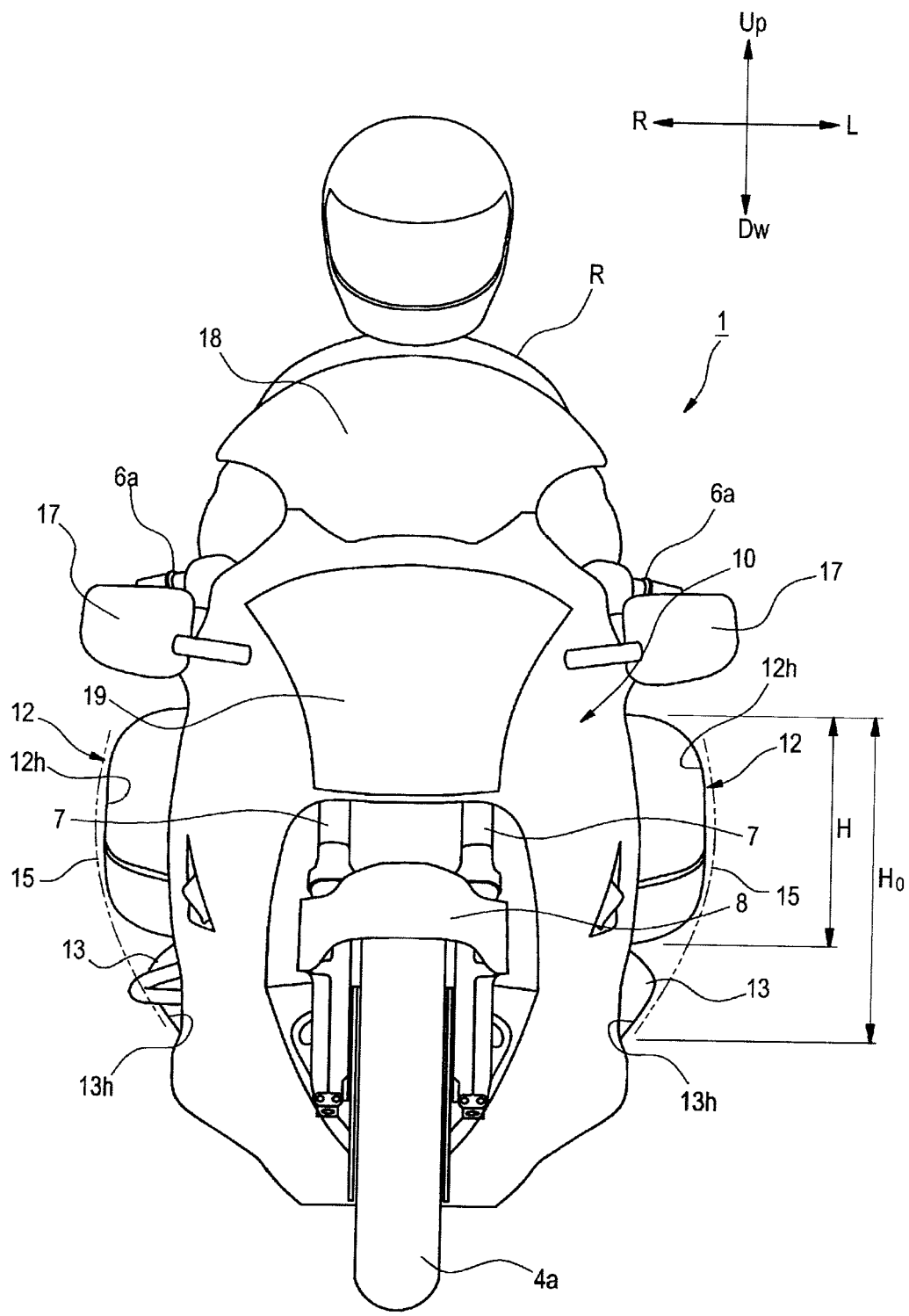
FIG. 3 is a front view of the motorcycle shown in FIG. 1 seen from the front of the vehicle.

Further, as shown in FIG. 3, each bulging part 12 is formed in a shape having a certain height H in a vehicle height direction. The bulging part 12 has a structure that enables the bulging part 12 to receive, in a vehicle height direction, airflow of (see FIG. 2) produced by the front cowl 10. Effects of this structure will be described later.

In the embodiment, the bulging parts 12 protrude to both the left and right of the vehicle in the vehicle widthwise direction more than the rear edges 10 of the front cowl 10 as described above. This configuration can give a large influence on the airflow during flow of air.

The working of the bulging parts 12 on the airflow af will be described below by referring to FIGS. 7(a) and 7(b).

FIGS. 7(a) and 7(b) are schematic diagrams showing, in a plan view, flow velocity distribution of the airflow af in a state where the rider R is seated on the motorcycle of the embodiment, with contour lines. FIG. 7(a) shows the flow velocity distribution observed in the case where the bulging parts 12 protrude largely (in the case of the embodiment), whereas FIG. 7(b) shows the flow velocity distribution observed in the case where bulging parts 120 having peak parts 200 are used and where the amount of protrusion is smaller than in the case of FIG. 7(a).

Further, in FIGS. 7(a) and 7(b), a relationship among flow velocities in magnitude is that Flow velocity area G>Flow velocity area F>Flow velocity area F>Flow velocity area E>Flow velocity area D>Flow velocity area C>Flow velocity area B>Flow velocity area A. Note that the relationship among these flow velocity areas A to G in magnitude shown in 8, which will be described later, is the same as that of FIG. 7.

First, FIG. 7(b) will be described.

In the case shown in FIG. 7(b), the airflow of the highest flow velocity area G, which is the fastest flow during flow of air (which is substantially in the state of laminar flow without being influenced by the vehicle body), is once separated from the rear edges 10a (see FIG. 2) of the front cowl 10, and flows toward the rear of the vehicle (toward the right in FIG. 7(b)) as it is. In other words, the areas whose respective flow velocities are lower than that of the flow velocity area G (i.e., the flow velocity areas A to F) constitute the airflow af which exists behind the vehicle with a larger length in FIG. 7(b) than in FIG. 7(a). Because the areas each with the lower flow velocity (the areas except for the flow velocity area G) extend largely toward the rear of the vehicle, the air resistance increases.

Further, the flow velocity area A whose velocity is the lowest extends relatively largely toward the rear of the vehicle from an intermediate part of rear side surfaces of the bulging parts 120, and is also formed in a big size between the rear edges 10a (see FIG. 2) of the front cowl 10 and the bulging parts 120. This makes a state where a part from the rear edges 10a of the front cowl 10 to a rear edge of the vehicle is substantially covered with a flow velocity close to that of the lowest flow velocity A. That the lowest flow velocity area A is formed not only behind the vehicle but also in the big size on the lateral side of the vehicle in this way means that the air resistance is large.

Next, FIG. 7(a) will be described.

As compared to the case of FIG. 7(b), it is learned in the case of FIG. 7(a) that because of the existence of the bulging parts 12 protruding outward of the rear edges 10a (see FIG. 2) of the front cowl 10 in the vehicle widthwise direction, the highest flow velocity area G is brought into contact with the peak parts 20 of the bulging parts 12 again. By bringing the flow velocity area G into contact with the bulging parts 12 again, the airflow af of the flow velocity area G having been once separated from the vehicle body is attracted to the bulging parts 12 again. Thereby, the airflow af can be controlled through outer surfaces of the bulging parts 12 in a way that the low flow velocity areas A to F are reduced in size behind the vehicle.

To put it differently, the force along the rear side surfaces 12r (see FIGS. 2 and 4) located rearward of the peak parts 20 of the bulging parts 12 acts on the flow velocity area G having contacted the vehicle body again. Thereby, the airflow af having contacted the vehicle body again can be guided toward the center behind the vehicle.

In this way, the airflow af having been once divided by the vehicle can be effectively guided toward the rear of the vehicle in a way that comes close to each other. As a result, the airflow af on the rear side of the vehicle can be stabilized, so that the air resistance can be reduced. This can be learned from the fact that the airflow af is guided toward the center behind the vehicle by the shape of the front surface of each bulging part 12. Thus, the low flow velocity areas F, E, D, C, B, and A behind the vehicle are smaller than those of FIG. 7(b).

Figure 4:
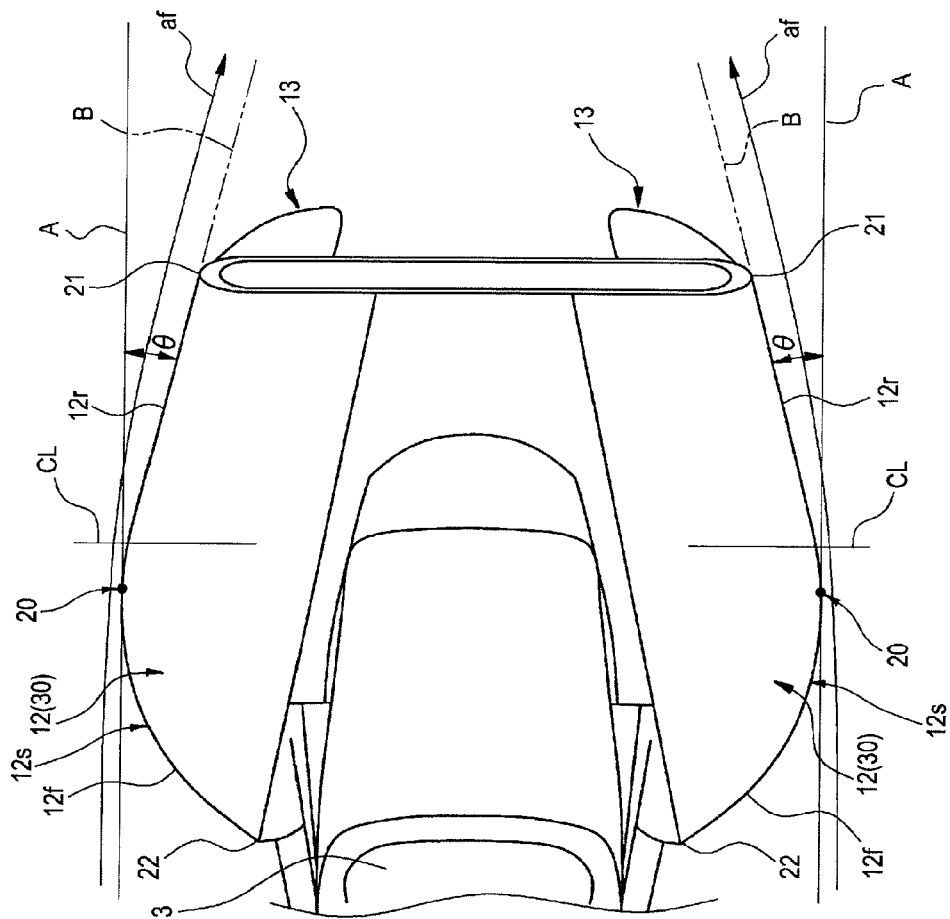
FIG. 4 is a magnified plan view of a rear part of the motorcycle shown in FIG. 2.

Further, in the embodiment, as shown in FIGS. 2 and 4, the peak parts 20 are each located at a position closer to the front of the vehicle within the length of the corresponding bulging part 12 in the vehicle front-rear direction. Hence, each rear side surface 12r can be formed longer. Thereby, the flow velocity area G and the like having contacted the vehicle body again can be guided with their larger lengths, enhancing its guidance effect.

Furthermore, owing to the structure in which the front side surfaces 12f of the bulging parts 12 are each in the form of a curve bulging toward the outside of the vehicle in the plan view of the vehicle, the airflow af having been separated from the rear edges 10a of the front cowl 10 can be to made to flow while being smoothly brought into contact with the bulging parts 12 again.

The bulging parts 12 each protrude with the large volume, and are each formed as a side trunk 30 in the embodiment.

Thus, each side trunk 30 is effectively used not only to make the airflow af favorable but also as a large storage space protruding largely to a corresponding one of the left and right in the vehicle widthwise direction.

In addition, the side trunk 30 is formed of a trunk upper part 12a and a trunk lower part 12b, for example. The trunk upper part 12a can be opened and closed through a hinge structure or the like, which is not illustrated, along a border line 12c extending in the vehicle front-rear direction, and articles can be stored in the trunk.

Further, in the embodiment, each bulging part 12 is formed in the shape of a curve that continues to a rearmost end part 21 of the bulging part 12 in the plan view of the vehicle. Forming the bulging part 12 in an approximate streamline shape that continues to the rearmost end part 21 of the bulging part 12 in this manner makes it possible to prevent the airflow af from being separated from the rear side surface 12r of the bulging part 12. Thus, the airflow af guidance function is optimized to enable the bulging part 12 to effectively reduce the air resistance.

As shown in FIG. 4, the embodiment has such a configuration that a maximum narrowing angle θ formed between a straight line A passing through each peak part 20 in the vehicle front-rear direction in the plan view of the vehicle and a tangent B to the rear side surface 12r extending from the peak part 20 of the bulging part 12 to the corresponding rearmost end part 21 is in a range of 0° to 15°. Note that the maximum narrowing angle θ is formed when the tangent B passes through the rearmost end part 21. To put it concretely, since the angle between the straight line A and the tangent B to the rear side surface 12r increases as the tangent B gets toward the rear along the rear side surface 12r from the peak part 20, the narrowing angle θ is largest when the tangent B passes through the rearmost end part 21.

The narrowing angle θ will be described below by referring to FIGS. 6 and 8(a) to 8(c).

The case of setting the narrowing angle θ within the range defined in the embodiment causes a different result from the case of setting the narrowing angle θ outside the defined range.

Figure 6:
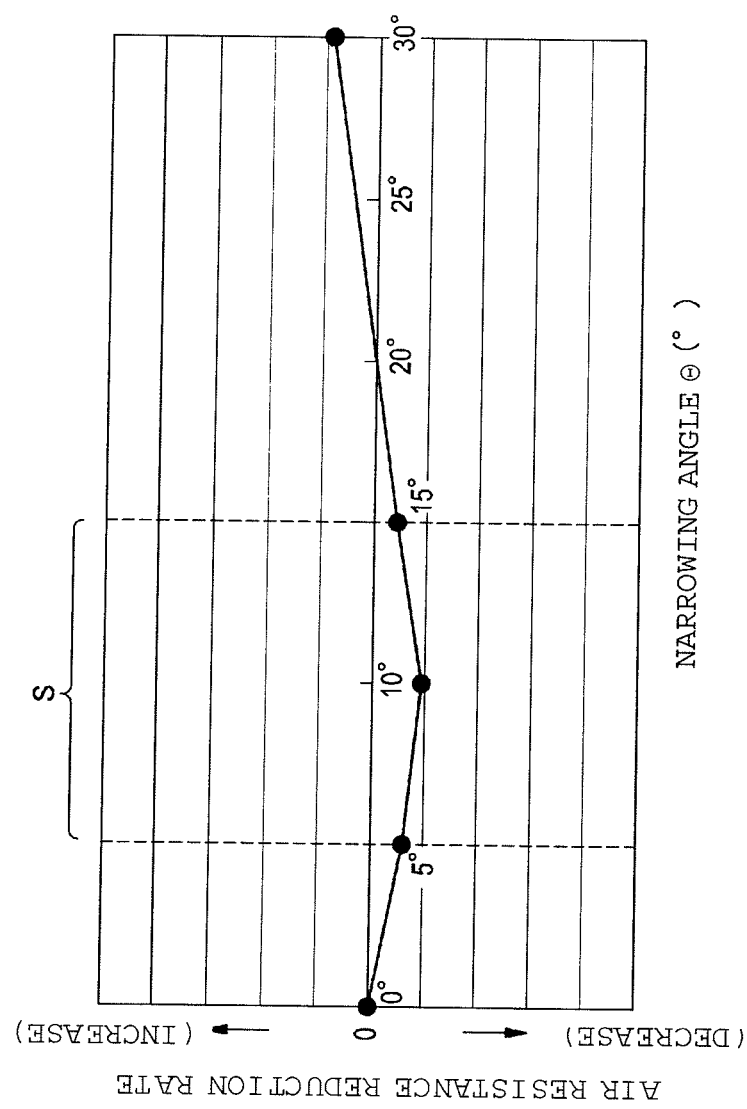
FIG. 6 is a graph showing the relationship between an air resistance reduction rate and a narrowing angle of each bulging part in the motorcycle of the present invention.

FIG. 6 is a graph showing the relationship between the air resistance reduction rate and the narrowing angle θ in the rear of the vehicle, and FIGS. 8(a) to 8(c) are schematic diagrams showing, respectively, flow velocity distributions observed in the cases where the narrowing angle θ of each bulging part 12 is 15°, 30° and 0°, with contour lines. In FIGS. 8(a) to 8(c), the amount of protrusion of each bulging part 12 and the location of each peak part 20 are the same.

Description will be given below of the cases where the narrowing angle θ of each bulging part 12 are 15°, 30° and 0°, respectively.

The embodiment shown in each of FIGS. 8(a) to 8(c) has a structure in which the airflow af is brought into contact with the vehicle body again at the peak parts 20 where the bulging parts 12 protrudes most.

First, a description will be given of FIG. 8(c) showing the case where the narrowing angle θ of each bulging part 12 is 0°.

When the bulging parts 12 each have a shape shown in FIG. 8(c), fast airflows af having contacted the bulging parts 12 again flow in parallel with each other toward the rear of the vehicle since the narrowing angle θ of each rear side surface 12r is 0°. In this case, the flow velocity area E converges within the range of illustration with a slightly larger length than in the case of FIG. 8(a), and the width in the vehicle widthwise direction of the area is slightly larger than in the case of FIG. 8(a). In addition, the widths of the other low flow velocity areas (i.e., the flow velocity areas A to D) are also larger, and particularly the width of the lowest flow velocity area A is the largest among the cases of FIGS. 8(a) to 8(c).

Next, referring to FIG. 8(b), description will be given of the case where each bulging part 12 has a narrowing angle θ of 30°.

In this case, since the narrowing angle θ of each rear side surface 12r is 30° which is relatively large, the fast airflow af having contacted the bulging parts 12 again is guided along the rear side surfaces 12r, and the widths (in the vehicle widthwise direction) of the low flow velocity areas (the flow velocity areas A to D) are tapered and thus become smaller than in the case of FIG. 8(c). However, because the narrowing angle θ is too large, the airflow af is separated from the rear side surfaces 12r, and the flow velocity area E extends so far behind the vehicle that the flow velocity area E cannot converge within the range which is illustrated. Furthermore, the lengths of the other low flow velocity areas (i.e., the flow velocity areas A to D) are also larger.

Next, referring to FIG. 8(a), description will be given of the case where each bulging part 12 has a narrowing angle θ of 15°.

In this case, since the narrowing angle θ of each rear side surface 12r is 15°, the airflow af having contacted the bulging parts 12 again is largely improved and thus becomes shorter in its length extending rearward, although the widths (in the vehicle widthwise direction) of the low flow velocity areas (the flow velocity areas A to D) are slightly larger than in the case of FIG. 8(b) in accordance with the larger width of the rearmost end parts 21 of the bulging parts 12.

In sum, setting the narrowing angle θ of each bulging part 12 at 15° makes it possible to guide the airflow af effectively inwardly behind the vehicle by avoiding the separation of the air from the rear side surfaces 12r, actively to stabilize the airflow af behind the vehicle. As a result, the air resistance during flow of air of the vehicle can be reduced as compared to the cases of FIGS. 8(b) and 8(c).

FIG. 6 is a graph showing a result of measuring the air resistance reduction rate while changing the narrowing angle θ of each bulging part 12 described above.

As shown in FIG. 6, the air resistance decreases while the narrowing angle θ is within a range of more than 0° to approximately 20°. Further, it is observed that, in this range in which the air resistance is reduced, the effect of the air resistance reduction appears apparently with the narrowing angle θ being in the range of 5° to 15° (range S).

In this respect, one may consider that when the narrowing angle θ of each of the rear side surfaces 12r of the side surfaces 12s of the bulging parts 12 is smaller than 5°, it is difficult to actively prevent the turbulence of the airflow af, and thus to exert its effect; and on the other hand, when the narrowing angle θ of the rear side surface 12r is smaller than 15°, it is possible to avoid the separation of the air which occurs when the narrowing angle is too large, and to actively stabilize the airflow af.

Figure 5:
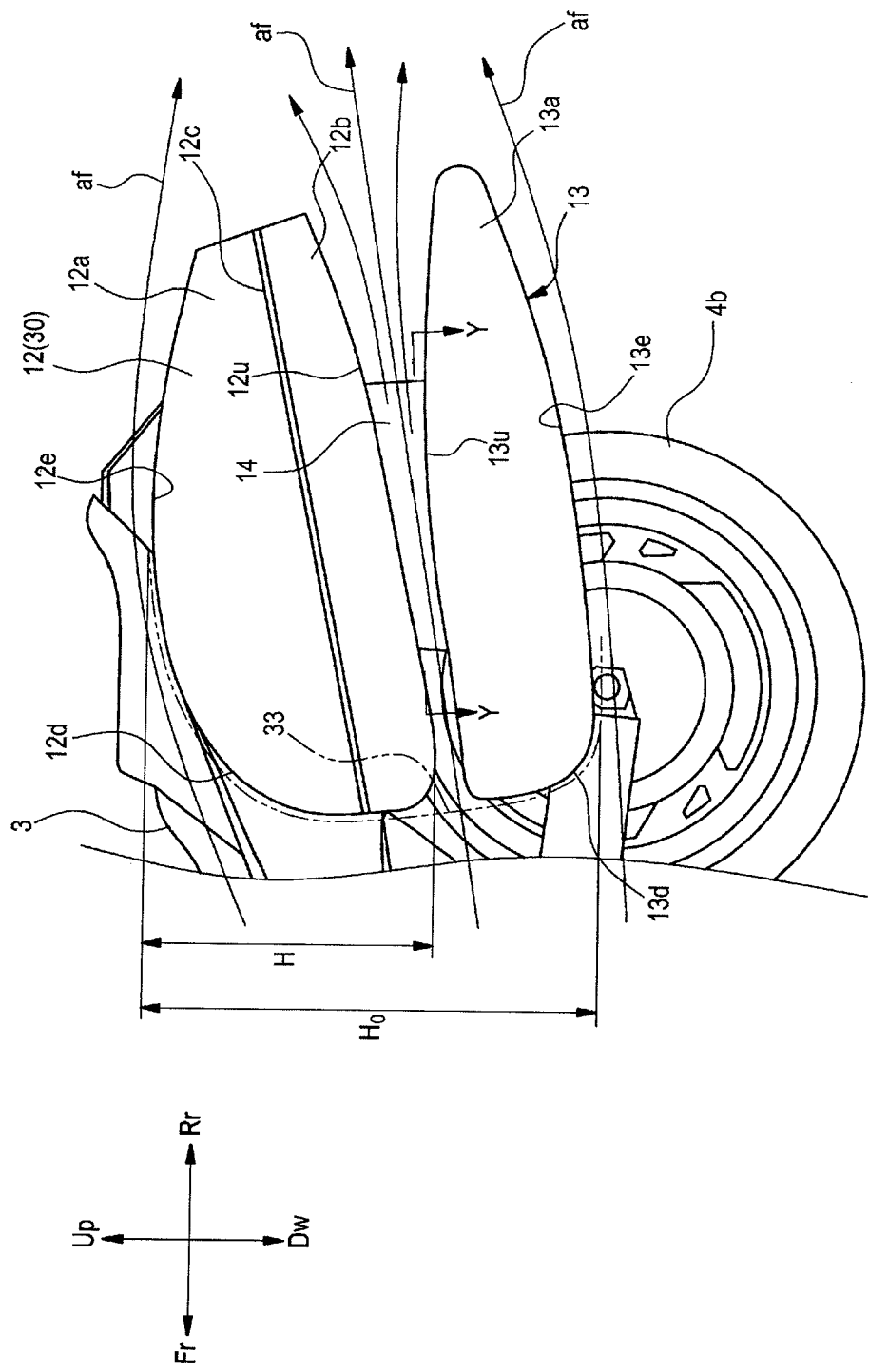
FIG. 5 is a magnified side view of a rear part of the motorcycle shown in FIG. 3.

Further, in the embodiment, as shown in FIGS. 1 and 5, the muffler parts 13 are placed, side by side, below and adjacent to the respective bulging parts 12 along the bulging parts 12 in the vehicle front-rear direction.

As described above, the muffler parts 13 each include: the muffler main body 13b and; the muffler cover 13a covering the muffler main body 13b.

As shown in FIG. 5, each bulging part 12 has an upper front curved part 12d which bulges upward from a front surface to an upper surface of the bulging part 12 in a side view; meanwhile, the corresponding muffler cover 13a has a lower front curved part 13d which bulges downward from a front surface to a lower surface of the muffler cover 13a in the side view. The upper front curved part 12d and the lower front curved part 13d are located on a single continuous curve 33 (which is indicated with a dashed two-dotted line, and which is illustrated by being shifted from its actual position for the sake of convenience).

In this way, the shape of an overall front-side outline of the bulging part 12 and the muffler part 13, as placed side by side with each other, matches the single continuous curved 33 in the side view of the vehicle. The shape of the two members paired in a vehicle up-down direction is less likely to disturb the airflow af.

The airflow af passing above the bulging part 12 and the airflow af passing below the muffler part 13 can form airflow af which flows toward the rear of the vehicle as if along the outer surface of a single member.

This makes it possible to reduce the air resistance in the airflow af along the structure which is formed by pairing the bulging part 12 and the muffler part 13 in the vehicle up-down direction.

Further, in the embodiment, as shown in FIG. 5, in the side view of the vehicle, each bulging part 12 has an approximate streamline shape formed of: the upper front curved part 12d located on an upper side of the bulging part 12; an upper rear curved part 12e located rearward of the upper front curved part 12d; and a lower curved part 12u located on a lower side of the bulging part 12. In other words, the bulging part 12 itself is formed in a shape constituting a part of the approximate streamline shape in the side view. Thereby, the bulging part 12 enables the airflow af to effectively flow toward the rear of the vehicle in the side view, and makes it possible to stabilize the airflow behind the vehicle body.

Furthermore, in the embodiment, as shown in FIG. 5, each muffler part 13 has: the lower front curved part 13d; a lower rear curved part 13e located rearward of the lower front curved part 13d; and a muffler upper curved part 13u located in an upper part of the muffler. In other words, the muffler part 13 itself is formed in an approximate streamline shape in the side view. Thereby, the muffler part 13 enables the airflow af to effectively flow toward the rear of the vehicle in the side view of its own, and makes it possible to stabilize the airflow behind the vehicle.

In the embodiment, as shown in FIG. 3, when viewed from a front of the vehicle, a bulging part vertical side surface 12h of each bulging part 12 and a muffler part vertical side surface 13h of the corresponding muffler part 13 have a shape constituting part of a side surface vertical direction curve 15 which continues as an almost level surface in the vehicle up-down direction (in this respect, the side surface vertical direction curve 15 is indicated with a dashed two-dotted line, and is illustrated by being shifted from their actual positions for the sake of convenience).

With the above configuration, a complex protrusion part made of the bulging part 12 and the muffler part 13, which protrudes outward of the front cowl 10 in the vehicle widthwise direction, is formed in a vehicle up-down direction area $H_0$ which extends from the bottom portion of the vehicle up to almost half the height of the vehicle.

Owing to the above shape in which the bulging part vertical side surface 12h of the bulging part 12 and the muffler part vertical side surface 13h of the muffler part 13 form the side surface vertical direction curve 15 in the vehicle up-down direction as well, a side-surface structure formed by pairing two members enables the airflow af to flow smoothly, and makes it possible to reduce the air resistance.

Figure 9:
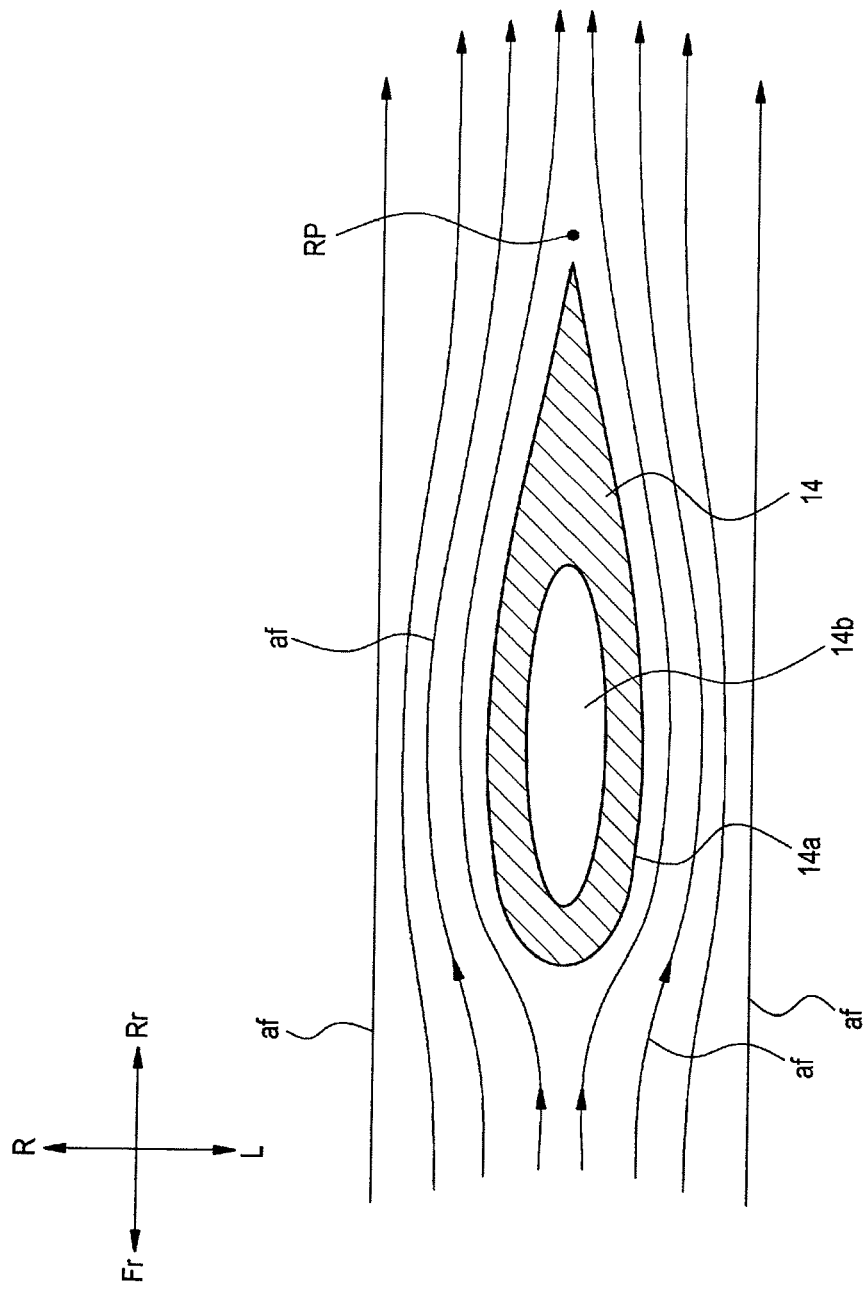
FIG. 9 is a cross sectional view of a muffler stay taken along the line Y-Y of FIG. 5, and is concurrently a schematic cross sectional diagram showing airflow around the muffler stay.

In the embodiment, each muffler part 13 is held by a muffler stay 14 extending out in a way that suspends the muffler stay 14 from the bulging part 12. Moreover, as shown in FIG. 9, the muffler stay 14 is formed in a way that the lines, which represent the respective left and right outer surfaces 14a of the streamline shape extending in the vehicle front-rear direction, makes the horizontal cross section of the muffler stay 14 shaped almost like the cross section of a wing.

Accordingly, not only can the load of the muffler part 13 be supported firmly by the muffler stay 14, but also the airflow af between the bulging part 12 and the muffler part 13 can be formed as a stable one af which is not separated from the muffler stay 14 at a rear point RP of the muffler stay 14. Thus, the air resistance can be reduced between the bulging part 12 and the muffler part 13.

Note that the muffler stay 14 in the embodiment has a hollow part 14b in its inner part, for example, and is reduced in weight.

Further, in the embodiment, the muffler parts 13 are provided on both the left and right sides of the vehicle, respectively. Providing the muffler parts 13 on both the left and right sides of the vehicle in this way makes it possible to make the overall structure on the rear side of the vehicle symmetric on both the left and right sides of the vehicle, to make the airflow af on both sides of the vehicle symmetric to form stable rear airflow, and thereby to reduce the air resistance.

Figure 10:
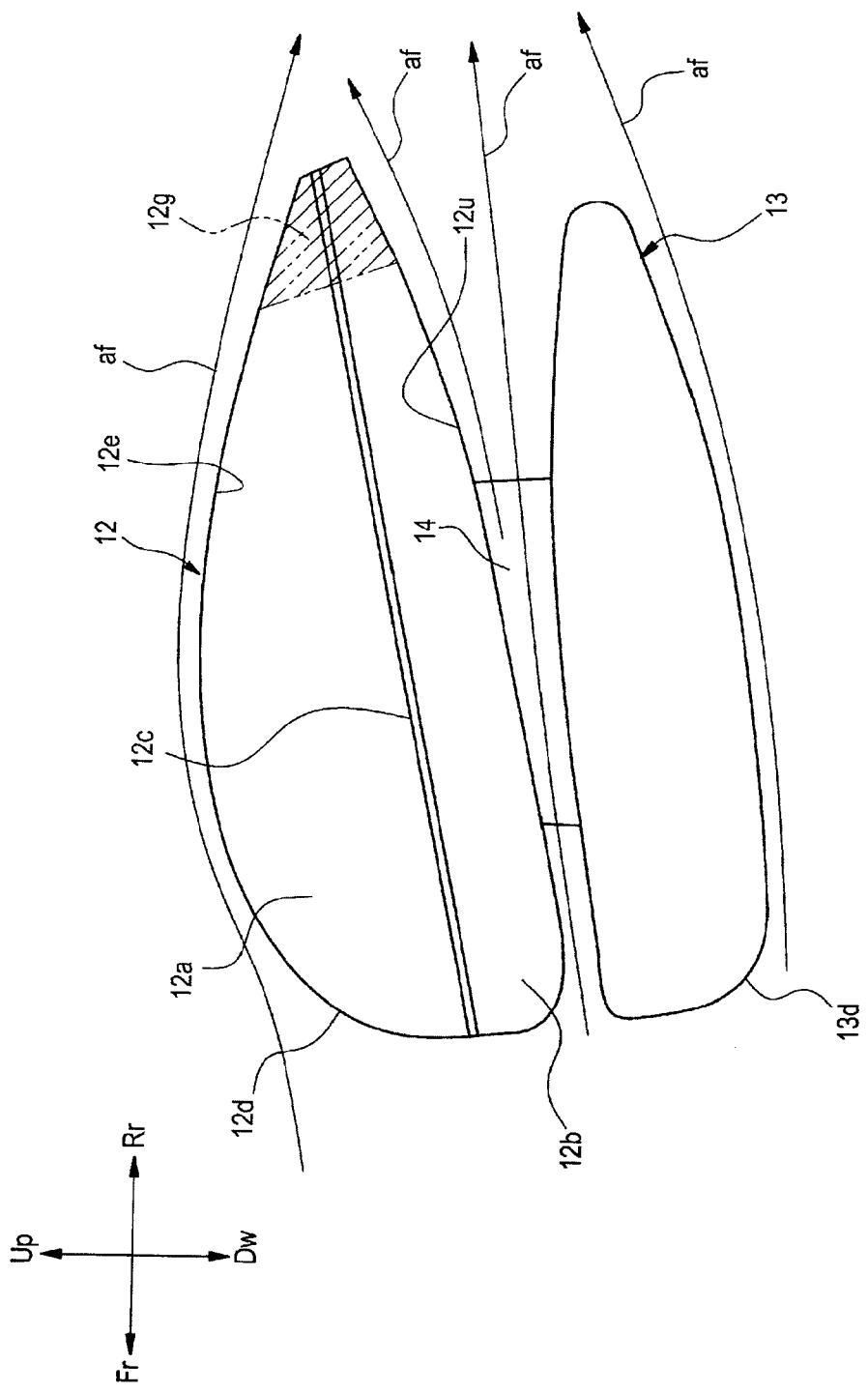
FIG. 10 is a right side view showing a chief part of a modification of the shape of the bulging part of the present invention.

Further, each bulging part 12 in the present invention may have a shape shown in FIG. 10.

The shape of the bulging part 12 shown in FIG. 10 has the same structure as that shown in FIG. 5, except for one point. The structure of the bulging part 12 shown in FIG. 10 is different from that of FIG. 5 in that a rearmost part 12g indicated with a dashed two-dotted line is added to a rear part of the bulging part 12.

In the side view of the vehicle, the rearmost part 12g is formed from curves obtained by extending the curve of the upper rear curved part 12e on the upper side of the bulging part 12 and the curved of the lower curved part 12u on the lower side of the bulging part 12 toward the rear of the vehicle longer than those shown in FIG. 5. Moreover, in the plan view, the bulging part 12 shown in FIG. 10 is formed from a curve obtaining by extending the rear side surface 12r (see FIG. 4) toward the rear of the vehicle, although not illustrated.

The structure which has a more streamline shape by being thus provided with the rearmost part 12g in the rear part of the bulging part 12 makes it possible to further enhance the airflow of guidance function.

The present invention has been described with the embodiment shown in FIGS. 1 to 10. However, the present invention is not limited to the above embodiment at all, but the shape of the bulging part or the shape of the muffler part may be modified as needed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle comprising:
a front cowl provided in a vehicle front part and a rear cowl provided in a vehicle rear part;
said rear cowl being provided with a bulging part protruding to the left and right in a vehicle widthwise direction;
said bulging part protruding outwardly of rear edges of the front cowl in the vehicle widthwise direction;
side surfaces of the bulging part are each formed in a curved shape that bulges toward the outside of the vehicle; and
a peak part, that is located at an outermost edge of the side surfaces in the vehicle widthwise direction, is located at a position closer to a front of the vehicle;
wherein the bulging part is formed from a side trunk.

2. The saddle-ride vehicle according to claim 1, wherein the bulging part is formed in an approximate streamline shape that continues from a foremost end part to a rearmost end part of the bulging part in the plan view of the vehicle.

3. The saddle-ride vehicle according to claim 1, wherein, in a plan view of the vehicle, a narrowing angle θ between a straight line (A) passing through the peak part in the vehicle front-rear direction and a tangent (B) to a rear side surface extending from the peak part to a rearmost end part is set in a range of 0° to 15°.

4. The saddle-ride vehicle according to claim 2, wherein, in a plan view of the vehicle, a narrowing angle θ between a straight line (A) passing through the peak part in the vehicle front-rear direction and a tangent (B) to a rear side surface extending from the peak part to the rearmost end part is set in a range of 0° to 15°.

5. The saddle-ride vehicle according to claim 1, wherein, a muffler part is placed below and adjacent to the bulging part;
the bulging part has an upper front curved part that bulges upwardly from a front surface to an upper surface of the bulging part in a side view;
the muffler part has a lower front curved part that bulges downwardly from a front surface to a lower surface of the muffler part in the side view; and
the upper front curved part of the bulging part and the lower front curved part of the muffler part are situated adjacent to each other on a continuous curve.

6. The saddle-ride vehicle according to claim 2, wherein, a muffler part is placed below and adjacent to the bulging part;
the bulging part has an upper front curved part that bulges upwardly from a front surface to an upper surface of the bulging part in a side view;
the muffler part has a lower front curved part that bulges downwardly from a front surface to a lower surface of the muffler part in the side view; and
the upper front curved part of the bulging part and the lower front curved part of the muffler part are situated adjacent to each other on a continuous curve.

7. The saddle-ride vehicle according to claim 1, wherein, in a side view of the vehicle, the bulging part is formed in an approximate streamline shape, including an upper front curved part located on an upper side of the bulging part, an upper rear curved part located rearwardly of the upper front curved part and a lower curved part located on a lower side of the bulging part.

8. The saddle-ride vehicle according to claim 2, wherein, in a side view of the vehicle, the bulging part is formed in an approximate streamline shape, including an upper front curved part located on an upper side of the bulging part, an upper rear curved part located rearwardly of the upper front curved part and a lower curved part located on a lower side of the bulging part.

9. The saddle-ride vehicle according to claim 5, wherein, in a side view of the vehicle, the muffler part is formed in an approximate streamline shape, including the lower front curved part, a lower rear curved part located rearward of the lower front curved part and a muffler upper curved part located in an upper part of the muffler part.

10. The saddle-ride vehicle according to claim 7, wherein, in a side view of the vehicle, a muffler part is formed in an approximate streamline shape, including a lower front curved part, a lower rear curved part located rearward of the lower front curved part and a muffler upper curved part located in an upper part of the muffler part.

11. The saddle-ride vehicle according to claim 5, wherein, in a front view of the vehicle, a bulging part vertical side surface of the bulging part and a muffler part vertical side surface of the muffler part are formed, situated on a side surface vertical direction curve.

12. The saddle-ride vehicle according to claim 5, wherein the muffler part is held by a muffler stay extending downwardly under the bulging part; and a horizontal cross section of the muffler stay in the vehicle front-rear direction is shaped streamline.

13. The saddle-ride vehicle according to claim 5, wherein the muffler part is provided on each of the left and right sides of the vehicle.

14. A cowl assembly for use with a saddle-ride vehicle comprising:

a front cowl operatively positioned in a front of the vehicle;

a rear cowl operatively positioned in a rear of the vehicle;

a bulging part formed on said rear cowl, said bulging part protruding to the left and right in a vehicle widthwise direction;

said bulging part protruding outwardly of rear edges of the front cowl in the vehicle widthwise direction;

side surfaces of the bulging part are each formed in a curved shape that bulges toward the outside of the vehicle; and a peak part formed at a position closer to a front of the vehicle, said peak part being located at an outermost edge of the side surfaces in the vehicle widthwise direction;

wherein the bulging part is formed from a side trunk.

15. The cowl assembly for use with a saddle-ride vehicle according to claim 14, wherein the bulging part is formed in an approximate streamline shape that continues from a foremost end part to a rearmost end part of the bulging part in the plan view of the vehicle.

16. The cowl assembly for use with a saddle-ride vehicle according to claim 14, wherein, in a plan view of the vehicle, a narrowing angle θ between a straight line (A) passing through the peak part in the vehicle front-rear direction and a tangent (B) to a rear side surface extending from the peak part to a rearmost end part is set in a range of 0° to 15°.

17. The cowl assembly for use with a saddle-ride vehicle according to claim 15, wherein, in a plan view of the vehicle, a narrowing angle θ between a straight line (A) passing through the peak part in the vehicle front-rear direction and a tangent (B) to a rear side surface extending from the peak part to the rearmost end part is set in a range of 0° to 15°.

18. The cowl assembly for use with a saddle-ride vehicle according to claim 14, wherein, a muffler part is placed below and adjacent to the bulging part;

the bulging part has an upper front curved part that bulges upwardly from a front surface to an upper surface of the bulging part in a side view;

the muffler part has a lower front curved part that bulges downwardly from a front surface to a lower surface of the muffler part in the side view; and the upper front curved part of the bulging part and the lower front curved part of the muffler are situated adjacent to each other on a continuous curve.

19. The cowl assembly for use with a saddle-ride vehicle according to claim 14, wherein, in a side view of the vehicle, the bulging part is formed in an approximate streamline shape, including an upper front curved part located on an upper side of the bulging part, an upper rear curved part located rearwardly of the upper front curved part and a lower curved part located on a lower side of the bulging part.

* * * * *